(12) United States Patent
Karem

(10) Patent No.: US 7,871,034 B2
(45) Date of Patent: Jan. 18, 2011

(54) ROTOR HUB SYSTEMS AND METHODS

(76) Inventor: Abe Karem, 1018 Timberline La., N. Tustin, CA (US) 92705

( * ) Notice: Subject to any disclaimer, the term of this patent is extended or adjusted under 35 U.S.C. 154(b) by 107 days.

(21) Appl. No.: 12/427,961

(22) Filed: Apr. 22, 2009

(65) Prior Publication Data

US 2009/0269200 A1    Oct. 29, 2009

Related U.S. Application Data

(60) Provisional application No. 61/047,167, filed on Apr. 23, 2008.

(51) Int. Cl.
*B64C 27/22* (2006.01)

(52) U.S. Cl. .................. 244/7 A; 244/17.11; 244/17.25; 416/134 A

(58) Field of Classification Search .................. 244/7 A, 244/17.11, 17.25, 75 A, 17.27, 17.13, 17.23; 416/155, 124, 98, 134 A
See application file for complete search history.

(56) References Cited

U.S. PATENT DOCUMENTS

| | | | |
|---|---|---|---|
| 2,648,387 A | 8/1953 | Doman | |
| 3,999,886 A | 12/1976 | Ormiston et al. | |
| 4,189,283 A | 2/1980 | McCoubrey | |
| 4,203,709 A * | 5/1980 | Watson | 416/134 A |
| 4,323,332 A | 4/1982 | Fradenburgh | |
| 5,165,853 A * | 11/1992 | Pancotti | 416/134 A |
| 5,387,083 A | 2/1995 | Larson et al. | |
| 5,562,415 A * | 10/1996 | Legendre et al. | 416/114 |
| 5,788,462 A * | 8/1998 | Legendre et al. | 416/134 A |
| 6,007,298 A | 12/1999 | Karem | |
| 6,099,254 A * | 8/2000 | Blaas et al. | 416/114 |
| 6,113,352 A * | 9/2000 | Certain et al. | 416/134 A |
| 6,607,161 B1 | 8/2003 | Krysinski et al. | |
| 6,641,365 B2 | 11/2003 | Karem | |
| 7,037,072 B2 * | 5/2006 | Carson | 416/1 |
| 7,244,102 B2 | 7/2007 | Delucis | |
| 7,264,199 B2 | 9/2007 | Zientek | |
| 7,335,128 B2 | 2/2008 | Flamang et al. | |
| 7,510,377 B1 * | 3/2009 | Carter et al. | 416/104 |
| 2006/0198732 A1 * | 9/2006 | Becker et al. | 416/134 A |

* cited by examiner

*Primary Examiner*—Christopher P Ellis
(74) *Attorney, Agent, or Firm*—Fish & Associates, PC

(57) ABSTRACT

A rotorcraft is equipped with a rotor hub of large diameter in order to accommodate high loads from a hingeless rotor. In preferred embodiments, a rotorcraft has a rotor disposed on a mast with blades attached to a hub by means of a feather bearing that receives a shank of a blade. The hub is attached to non-rotating structure such as a tilting nacelle by means of a hub bearing. This facilitates the transfer of moments generated on the rotor to the airframe. The hub and feather bearings can be sized and arranged such that a feather bearing on a hub is disposed within an imaginary cylinder centered at a rotational axis of the hub and having a diameter no greater 1.2 times an inner diameter of the hub bearing. This can result in a large diameter hub and hub bearing capable of withstanding very large bending moments.

16 Claims, 9 Drawing Sheets

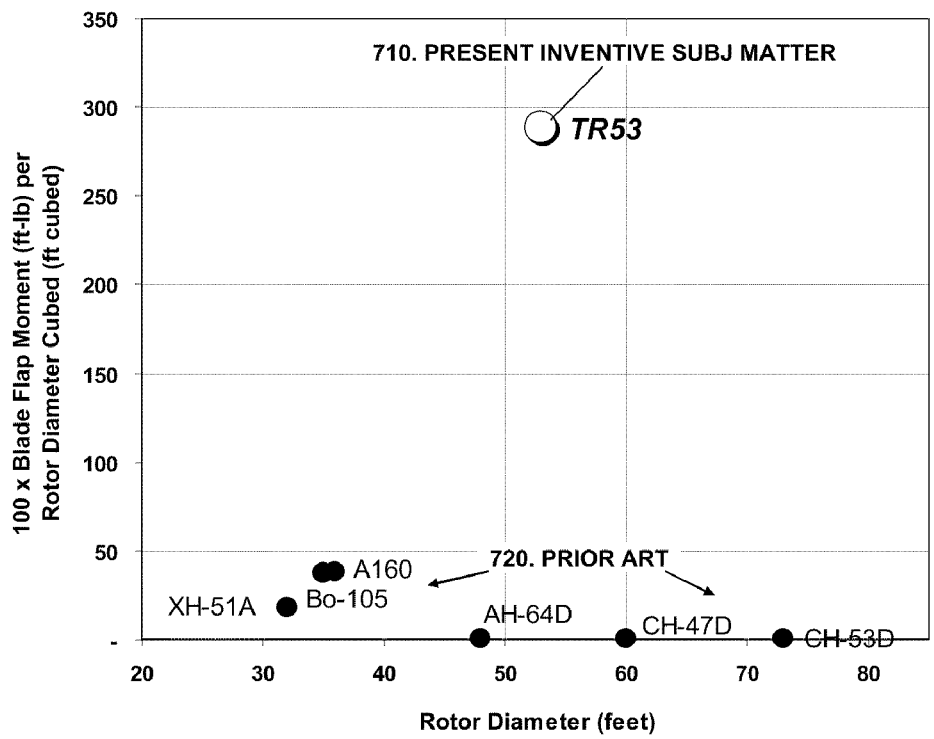
Figure 7 -- Hub Moment Parameter
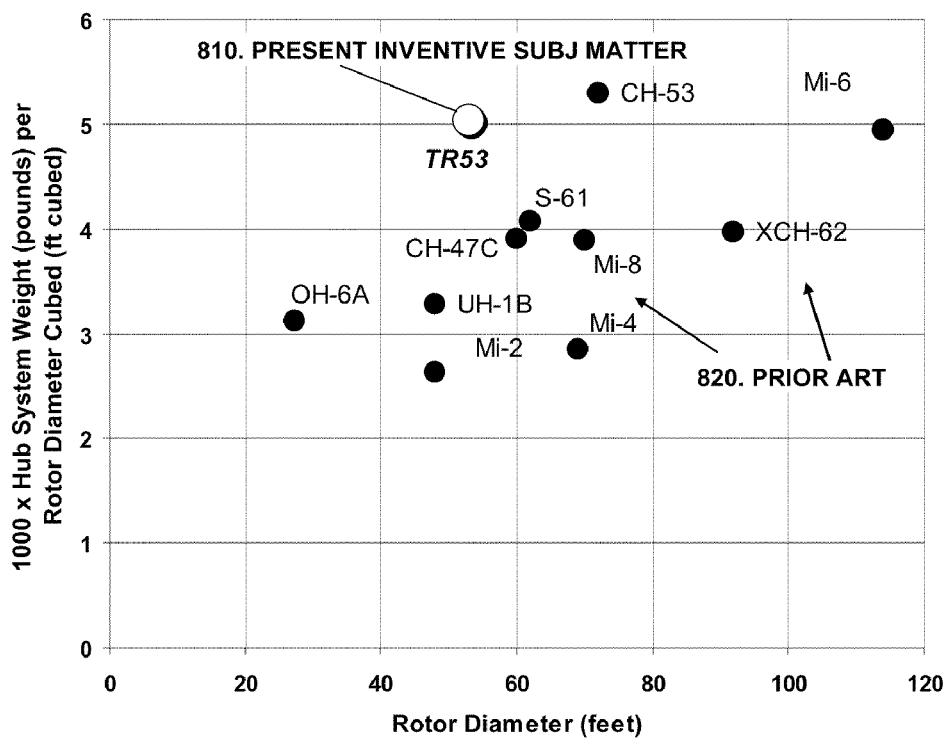
Figure 8 -- Hub Weight Parameter

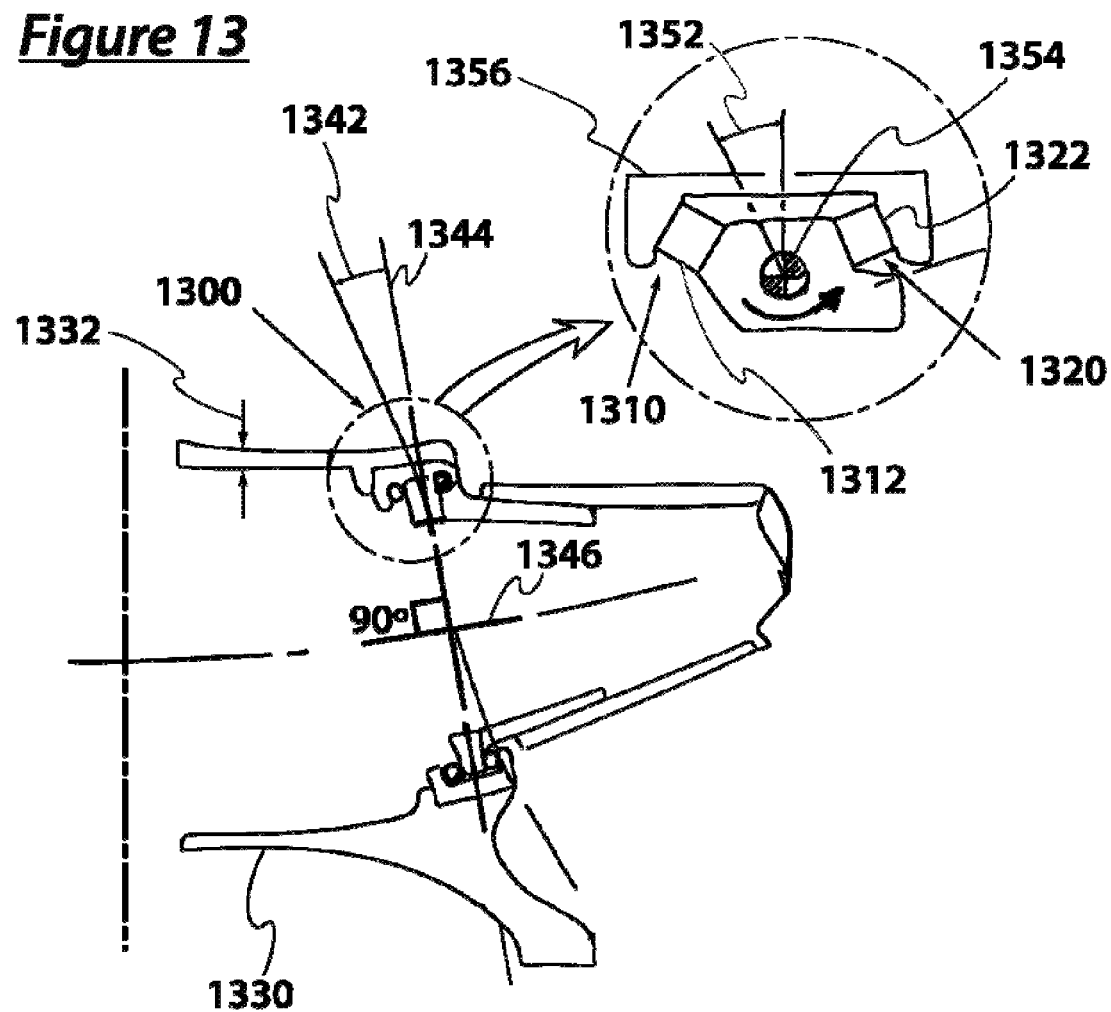

ROTOR HUB SYSTEMS AND METHODS

This application claims priority to U.S. Provisional Application Ser. No. 61/047,167 filed Apr. 23, 2008 which is incorporated by reference herein in its entirety.

FIELD OF THE INVENTION

The field of the invention is rotorcraft.

BACKGROUND

In rotorcraft, as exemplified by the tiltrotor rotorcraft of FIG. 1, the rotor hub 114 is at the heart of the rotor system 110 design, and central to the functioning of a rotorcraft. In the case of a tiltrotor 100, the rotor hub 114 transmits loads from a rotating rotor blade 116 to a tilting nacelle 112 carried by a wing 102. It is in the hub that additional rotor articulation degrees of freedom such as rotor blade feather, flap, or lag are accommodated.

There exist many different rotor configurations in the field of rotorcraft. The rotor configuration drives the hub configuration and requirements. In the case of an aircraft with a propeller, bending out of the rotating plane of the propeller is usually low, and axial thrust is high. Typically the propeller rotational speed, expressed in revolutions per minute (RPM), is significantly higher than that of a helicopter rotor, requiring a small diameter propeller shaft in order to keep the bearing tangential speeds within material and lubrication limits.

Unlike typical propellers, a helicopter rotor can change the feather (pitch) angle of blades in a non-uniform manner. Thus, for teetering, gimbaled, or articulated rotor types, a helicopter rotor can change the direction of (vector) the thrust of the rotor blade and rotor without vectoring the direction of the hub itself. FIG. 2A illustrates a typical articulated rotor helicopter 200, while FIG. 2B illustrates the rotor hub system 210 of the helicopter. Rotor blades 212 are connected to a rotor mast 214 and hub structure 216 by a flap hinge 218, pitch bearing 220, and lag hinge 222. These hinges allow the blades to move independently of the hub.

For hingeless or bearingless rotor types there are no flap or lag hinges, and a helicopter rotor can transmit some bending moments to the rotor mast, which supports the hub and rotor. FIG. 3 illustrates a hingeless rotor hub system 300, in which a rotor blade 302 is connected to a pitch bearing and housing 304 that attaches to a hub 306 rotating mast 308. Helicopters usually operate at a rotor RPM much lower than that of a propeller; in either case the product of diameter and RPM is usually such that the tip approaches sonic speeds at some flight conditions. The ability to transfer bending moments necessitates a stiffer rotor to mast connection, which must be accommodated by the rotor hub. Most often, the rotor hub transfers the axial and bending loads down a small diameter mast structure into an internal frame structure or gearbox, and that structure is in turn mounted to the airframe.

FIG. 4A illustrates a helicopter 400 with a teetering rotor system 410, while FIG. 4B shows additional detail on the teetering rotor and hub system 410. For this type of hub system 410, the teetering rotor is attached directly to a long mast 412 having a small diameter. The mast 412 couples the non-rotating helicopter structure 402 to the helicopter blades 414. Blade pitch change is accommodated with a feather bearing 416. The rotor hub system 410 is hinged with respect to the mast 412 by means of a teetering hinge 418. The teetering rotor allows the rotor to vector the thrust direction, but produces only very small moments in the rotor mast. Any mast loads are commonly resisted by an internal structure with bearings whose diameter is a small fraction of that of the dimensions of the airframe structure to which it attaches.

In the case of a hingeless rotor, the hub structure takes bending moments as well as provides for rotor blade feathering. Hingeless rotor hubs exist in many applications. FIG. 5 illustrates the prior art of the Sikorsky™ X2 demonstrator hingeless coaxial rotor hub system 500, which includes upper 510 and lower 520 rotor hubs that couple blades 530 to non-rotating structure 540. Blade feather bearings in housings 512 allow the blade to pitch; the blade feather bearings are placed at a distance approximately two times the hub bearing 514 diameter.

FIG. 6 illustrates the prior art of a Eurocopter™ Bo 105 rotor hub 600. The Bo 105 rotor hub 600 is machined from titanium and houses bearings 610 that allow blade 620 feathering. This hingeless rotor hub 600, like other prior art hingeless rotor hubs, does not and cannot absorb very large bending moments on the order of hundreds of thousands of foot-pounds of moment. Additionally, most hingeless rotor hubs are used in helicopter rotor applications where the total angular travel of blade feather is less than 40 degrees total. In this manner, many of these applications are able to use flexible elements for the feathering joint. Currently the rotorcraft industry trends toward hingeless rotor designs with lower total part count and fewer moving parts. Elastomeric bearing elements and flexible beam elements are common.

In applications where the rotor blade feathering motion is supported by a rolling element joint, lubrication for this joint is usually permanent, such as grease, and requires no continuous cycling of lubricant. Consequently, the real-time means by which to monitor the joint health is by temperature sensing. The flow of lubricant through a rolling element joint would otherwise allow for bearing health monitoring by means of a chip detector and/or temperature sensor. In some cases, a rolling element feathering joint such as (U.S. Pat. No. 5,387,083 to Larson) is fed by a lubrication distribution and cooling system included in the rotating frame of the hub. Due to this lack of hub bearing lubrication systems, or the isolation of the cooling system in the rotating frame, current hub systems can be detached in the field from the gearbox assembly that drives them. Thus, the gearbox and rotor hub system of conventional rotorcraft are separate field replaceable units.

The '083 patent, and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Outside the field of rotorcraft, designers have developed different rotor hub designs to deal with issues specific to those other fields. In the field of large windmills, for example, efficient use of structure is a major focus. U.S. Pat. No. 7,335,128 to Flamang et al. proposes the use of a rotor hub-to-nacelle coupling that directly transfers the bending and in-plane loads from the rotor into the nacelle structure. The gearbox in that design is isolated from the bending and in-plane load path, coupled only torsionally to the rotor hub.

Flamang '128 proposes a coupling arrangement from a windmill rotor hub to nacelle windmill nacelle. As will be appreciated by those skilled in the art, a windmill generally seeks, by rotating the nacelle into the wind, to run in stable axial flow conditions through the rotor, and therefore has comparatively low blade and hub bending moments. The bearing arrangements from Flamang '128 indicate that the loads on the windmill rotor are predominantly in the plane of the rotor.

Unlike most hingeless rotors, an Optimum Speed Rotor (OSR), U.S. Pat. No. 6,007,298, or an Optimum Speed Tilt Rotor (OSTR), U.S. Pat. No. 6,641,365, are capable of higher moments at the hub. The initial implementation of OSR technology, in the Boeing™ A160, used a relatively small 36 foot diameter rotor. An especially preferred embodiment referenced in the OSTR patent is a 30 foot diameter rotor.

An OSTR rotor, like all rotors, is subject to dynamic aeroelastic loads, and is generally designed to avoid instabilities. As a rotor design is scaled up, such dynamic solutions dictate an increase in rotor weight proportional to rotor diameter cubed. This would remain true unless a different and lighter dynamic solution is applied for a larger rotor. Rotor weight has a substantial effect on rotorcraft empty weight and therefore on the useful load (payload and fuel) per rotorcraft size and cost.

At a constant disc loading, the lifting capability of the rotorcraft is proportional to the rotor diameter squared while the rotor weight is proportional to the rotor diameter cubed. This is known as the square-cube law in the industry and results in both an undesired trend of increased disc loading in larger rotorcraft, and extreme difficulty in designing very large rotorcraft. Because of the high bending loads associated with hingeless rotors, hingeless rotors have been historically flexible, and limited to small rotors in order to avoid the increase in rotor weight resulting from these loads. Large rotor designs often increase disc loading in order to reduce the diameter required for a given vehicle weight. Furthermore, prior art large rotor designs have articulated hub systems to minimize blade flap and hub bending moments.

If rotorcraft with stiff, hingeless rotors were to be conceived at larger scales and higher disc loadings, the approach to obtaining lightweight and stiff rotor designs would necessarily diverge from the embodiments described in the '298 and '365 patents. One aspect that would need to be engineered is the reduction of deflections of the bearing supporting areas of the hub structure. For long life rolling element operation, the bearing support structure must remain relatively planar and round. Although these goals are not unique to rotor hub designs, see for example U.S. Pat. No. 7,244,102 to Delucis, the magnitude of loads and relative nature of the concept of what constitutes lightweight in proportion to size are completely different between rotorcraft and land-based wind turbines.

Therefore, what is needed in the rotorcraft industry is a high moment capable hub structure for a rotorcraft, having sufficient strength and stiffness to operate under very large bending moment loads, on the order of hundreds of thousands or millions of foot-pounds of moments.

SUMMARY OF THE INVENTION

The present invention provides apparatus, systems, and methods in which a rotorcraft is equipped with a rotor hub of an extraordinarily large diameter in order to accommodate high loads from a hingeless rotor.

In preferred embodiments, a rotorcraft has a rotor disposed on a mast with a plurality of blades attached to a hub by means of a feather bearing that receives a shank of a blade. The hub is attached to non-rotating structure such as a tilting nacelle by means of a hub bearing. This arrangement facilitates the transfer of control moments generated on the rotor to the airframe.

The hub and feather bearings can be advantageously sized and arranged such that a feather bearing on a hub is disposed within an imaginary cylinder centered at a rotational axis of the hub, and having a diameter no greater than 0.9, 1.0, 1.1, or 1.2 times an inner diameter of the hub bearing. In especially preferred embodiments, this results in a hub with a large diameter hub bearing capable of withstanding bending moments of at least 50000, 100000, 500000, or even 1000000 foot-pounds.

It is contemplated that preferred hubs are especially useful when coupled with a rotor having a diameter of at least 20, 40, 80, 100, or even 120 feet. In some preferred embodiments, the hub is disposed on a mast that is tilting. In especially preferred embodiments, a tiltrotor aircraft is equipped with a non-rotating wing that carries a tilting nacelle serving as a mast.

Preferred rotors comprise one or more blades coupled to a hub by means of a feather bearing, facilitating pitching rotation of a blade about a blade pitch axis. In especially preferred rotors, the feather bearing is a tapered roller bearing and comprises a plurality of rolling elements. Further, the rolling elements can be advantageously cooled and lubricated with liquid oil under a pressure greater than atmospheric pressure. In rotorcraft applications, it is preferable to configure the rotor and control system to allow first and second rotor blades to be capable of a concurrently different feather angles from each other, commonly known as cyclic control of blade pitch. Through the use of cyclic pitch, large moments can be generated on rotor blades and transferred to an airframe to control an aircraft.

Preferred rotors are hingeless, and thus have no flap or lag hinges. More preferred rotors do no have elastomeric bearings. Especially preferred aircraft are capable of sustained flight with at least a 20%, 25%, 30% or more rotor rotational speed variation of a variable speed rotor such as an Optimum Speed Tilt Rotor (OSTR).

BRIEF DESCRIPTION OF THE DRAWING

FIG. 4A is a perspective illustration of a prior art helicopter with an articulated rotor system, while

FIG. 7 is a plot of the hub moment parameter of a hub according the to present inventive subject matter and the hub moment parameters of a number of prior art designs.

FIG. 8 is a plot of the hub weight parameter of a hub according the to present inventive subject matter and the hub weight parameters of a number of prior art designs.

FIG. 11 is a cutaway side view of the hub of FIG. 10, while FIG. 11A is a side view detail of the hub bearing and FIG. 11B is a side view detail of the feather bearing.

FIG. 13 is a side view schematic of a preferred feather bearing configuration.

DETAILED DESCRIPTION

Figure 1:
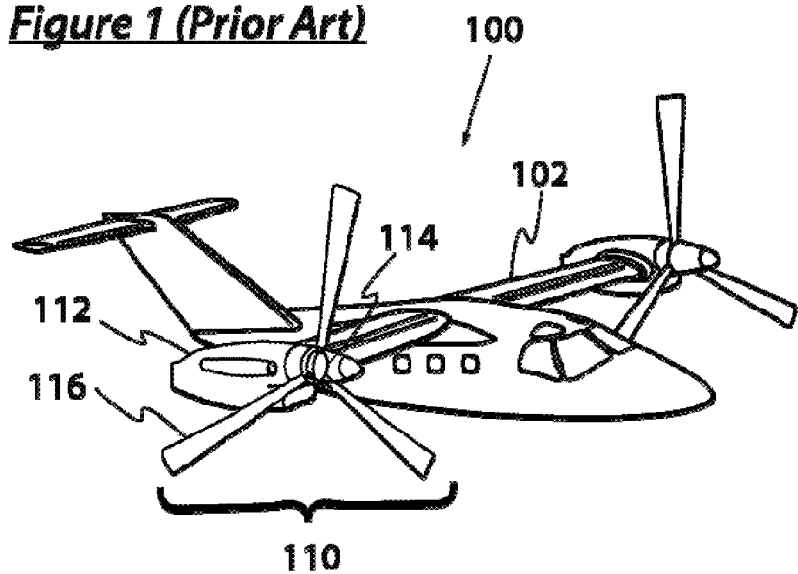
FIG. 1 is a perspective drawing of a prior art tiltrotor
Figure 2A:
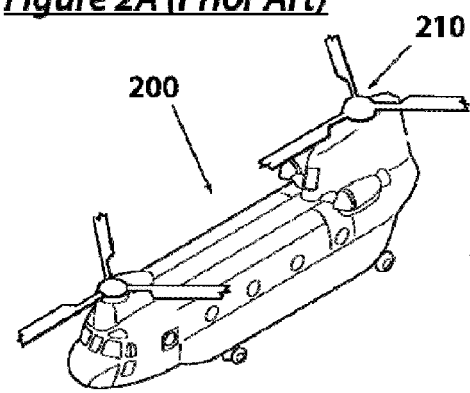
FIG. 2A is a perspective drawing of a prior art helicopter with articulated rotors.
Figure 2B:
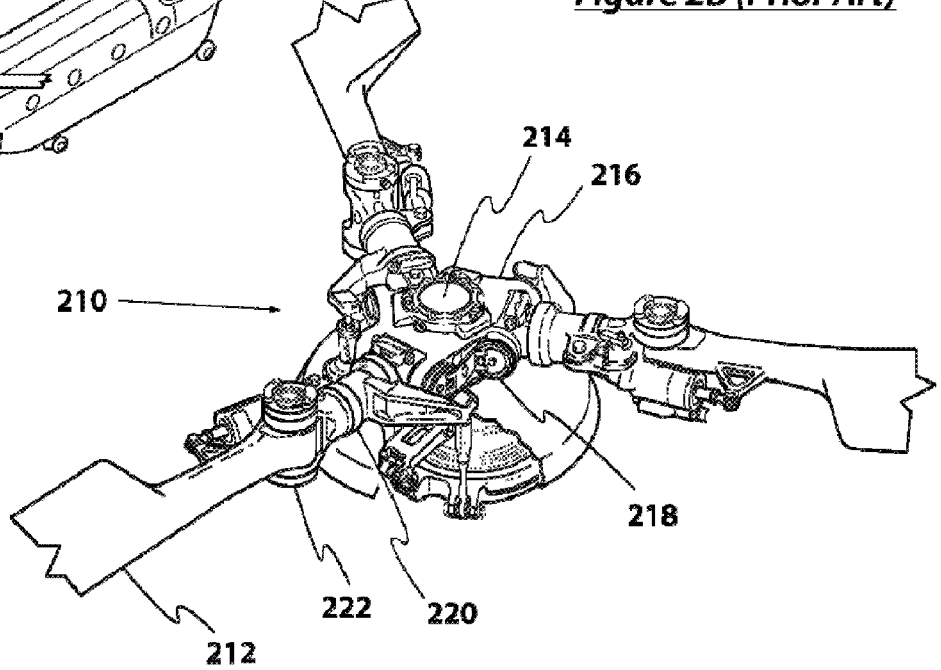
FIG. 2B is a perspective illustration of a prior art articulated rotor system.
Figure 3:
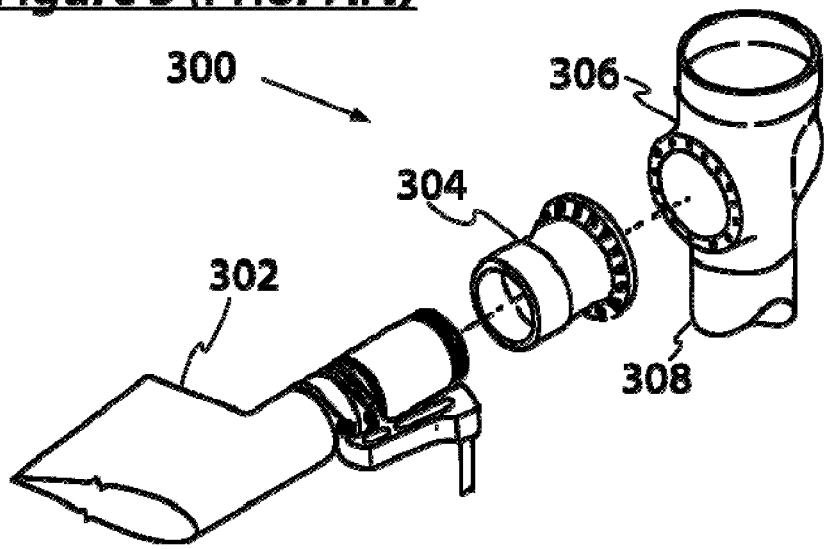
FIG. 3 is an exploded diagram of a prior art hingeless rotor hub
Figure 4A:
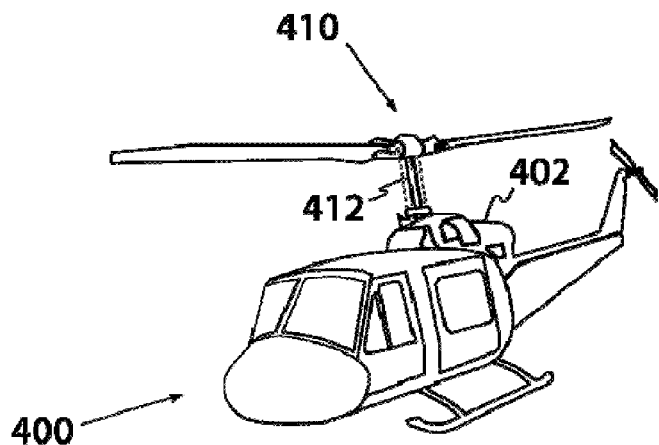
Figure 4B:
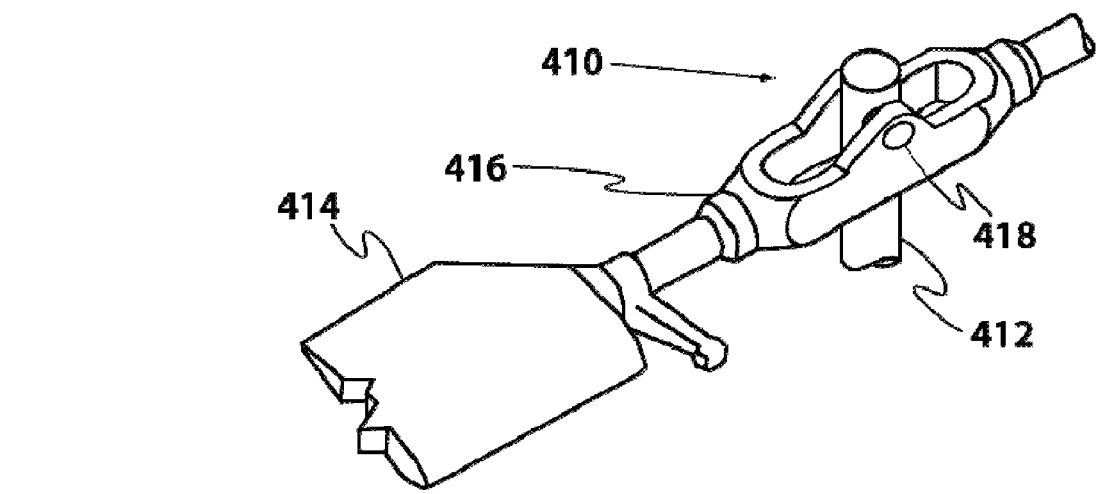
FIG. 4B is a perspective detail of the rotor system.
Figure 5:
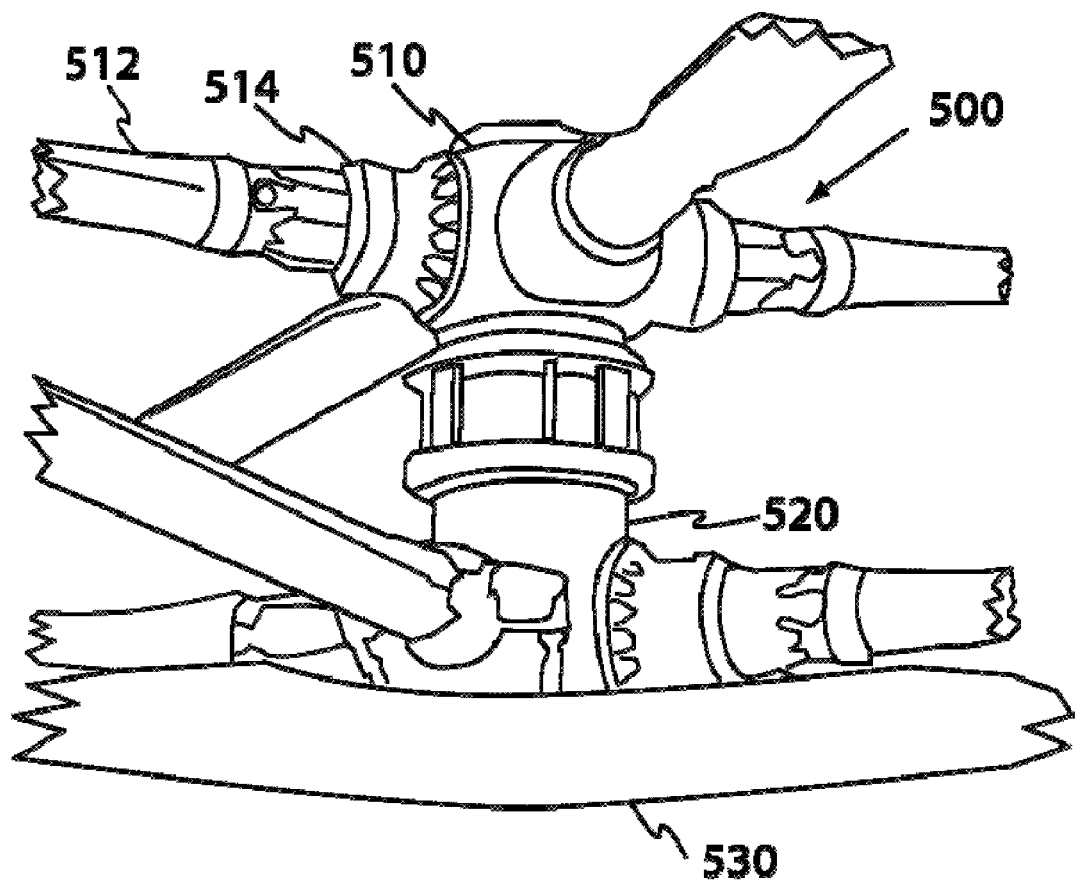
FIG. 5 is a perspective illustration of the prior art Sikorsky™ X2 coaxial rotor system.
Figure 6:
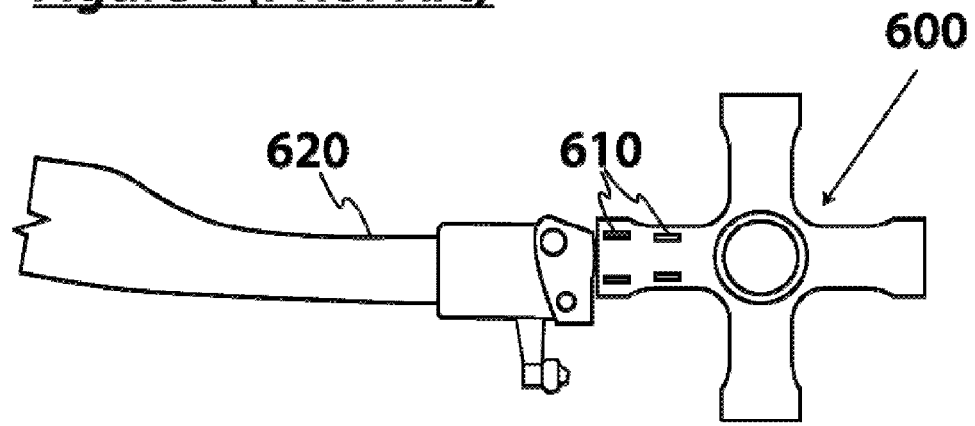
FIG. 6 is a top-view drawing of the prior art Eurocopter™ Bo 105 hingeless rotor system

This specification reveals several inventive aspects for providing high moment capable hub structures. Preferred hubs can sustain bending loads at the hub attachment from the blades corresponding to a hub moment parameter, M, between 100 and 600. The highest M in the prior art is about 40.

This extraordinarily high load bearing capability can be implemented in several ways, including iterating design of the bearing supporting structure to reduce deflections of the race out of a rotational plane of the feather bearings. This can advantageously be accomplished by tailoring the hub structure to flex to reduce bending of the feather bearings out of their rotational planes, or supporting the feather bearings with flexible elements Such high load bearing capability can be further implemented by utilizing an extraordinarily large diameter hub bearing, where the feather bearings are disposed at about the same radius from the center of rotation as the rolling elements of the hub bearing.

Still other aspects involve the lubrication system, including use of a common liquid oil to lubricate both the feather bearings and the transmission. It is especially contemplated that such lubrication systems can be replaced along with the hub, without opening the lubrication system.

The Hub Moment Parameter, M

One particularly useful way of evaluating rotor hub designs comes from examining the physics associated with different rotor and hub combinations. When a rotor design is scaled up or down in size, the flap bending moment that the rotor blade transfers to a hub in foot-pounds, designated F, goes up with the rotor diameter in feet, D, cubed. Thus, a convenient metric for evaluating the characteristics of a hub is obtained by normalizing the flap bending moment capability of a rotor hub with the geometric scale factor, the cube of rotor diameter:

$$\text{Hub Moment Parameter} = M = 100 \times \frac{\text{Flap Bending Moment}}{\text{Rotor Diameter Cubed}} = 100 \times \frac{F}{D^3}$$

FIG. 7 presents a comparison of the Hub Moment Parameter according to preferred embodiments 710 against a number of prior art designs 720, including several of the stiffest hingeless rotor hubs previously built. While other factors besides the cube of rotor diameter could be included for the normalization such as rotor disc loading, normalization by the geometric scale factor provides an easily available metric. Because moment increases with disc loading, if disc loading were included, an even larger gap between prior art and the present invention could be shown.

The Hub Weight Parameter, W

A complimentary tool for evaluating the weight efficiency of rotor hub designs is the Hub Weight Parameter, W. When a rotor design is scaled up or down in size, to retain the same dynamic characteristics, the weight of the rotor hub system in pounds, designated H, increases with the rotor diameter in feet, D, cubed. The rotor hub system weight includes the hub structure, articulations, and bearings, but not blades or actuators. Thus, a convenient metric for evaluating the relative lightness of a hub is obtained by normalizing the weight of a rotor hub system with the geometric scale factor, the cube of rotor diameter:

Hub Weight Parameter =

$$W = 1000 \times \frac{\text{Rotor Hub Weight}}{\text{Rotor Diameter Cubed}} = 1000 \times \frac{H}{D^3}$$

FIG. 8 presents a comparison of the Hub Weight Parameter according to preferred embodiments 810 against a number of prior art designs 820, over a large range of rotor diameters. It should be noted that hub moment parameter, M, can be divided by the hub weight parameter, W, to yield a measure of hub structural efficiency, M/W. For especially preferred embodiments, the hub structural efficiency M/W, is 57.

High Performance Tiltrotor Aircraft

Figure 9:
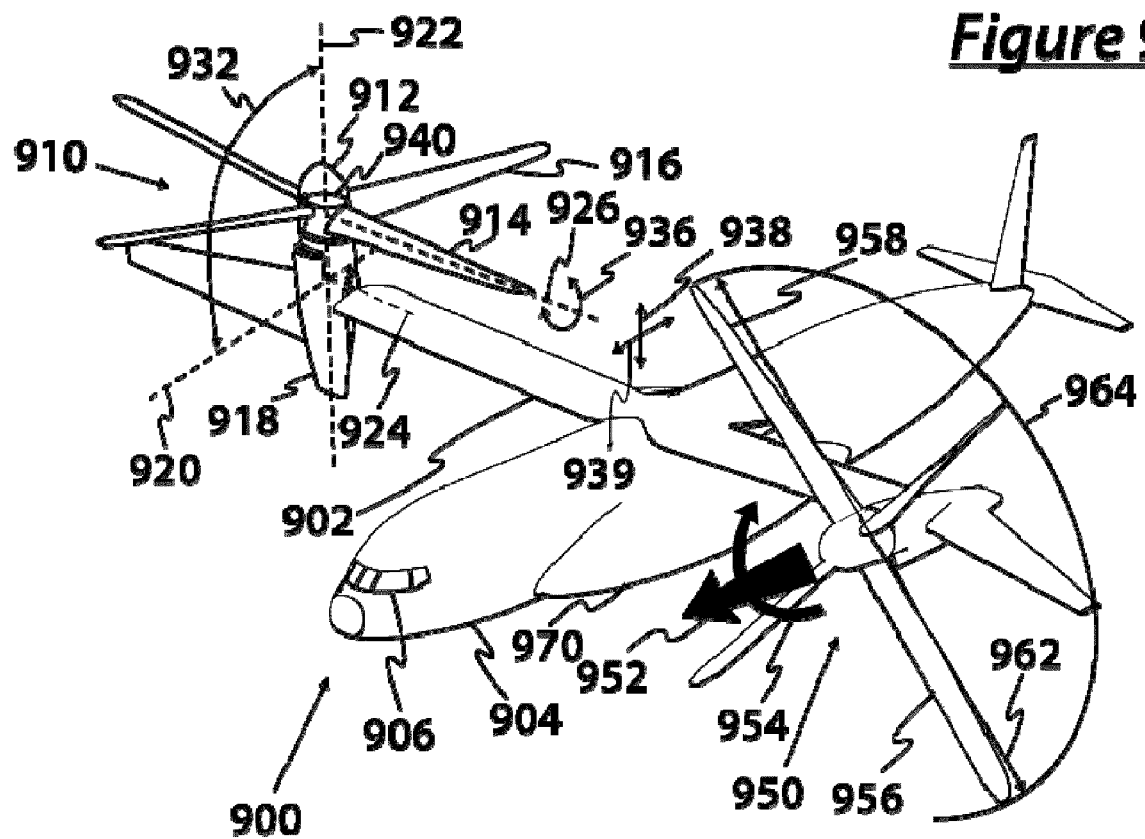
FIG. 9 is a perspective illustration of a preferred tiltrotor aircraft with a hingeless rotor system, and a provision for landing gear.

FIG. 9 is a perspective illustration of a preferred tiltrotor aircraft 900 comprising a wing 902, cockpit 906, and fuselage 904, a first tilting rotor system 910 shown in helicopter-mode position, and a second tiling rotor system 950 shown in airplane cruise-mode. In practice, both the first and second tilting rotor systems 910, 950 are likely to have substantially the same orientation in flight at any given time. A rotor system 950 comprises rotor blades 956, 958 that trace a path 964 that defines a rotor diameter 962. Preferred rotors have rotor diameters of at least 20 feet, 40 feet, 53 feet, 65 feet, 75 feet, 90 feet, or even 120 feet. FIG. 9 also depicts a housing or other provision 970 for a landing gear.

Unless a contrary intent is apparent from the context, all ranges recited herein are inclusive of their endpoints, and open-ended ranges should be interpreted to include only commercially practical values. Similarly, all lists of values should be considered as inclusive of intermediate values unless the context indicates the contrary.

The wing 902 remains essentially fixed to the fuselage 904 during flight in either vertical takeoff mode or cruise flight. In preferred embodiments, the first and second rotors in the first and second rotor systems 910, 950 are of a stiff hingeless variety including for example that described in U.S. Pat. No. 6,641,365. Such a rotor system 950 transmits considerable forces and moments to the wing 902 and fuselage 904. In either helicopter-mode flight or airplane-mode cruise flight, the rotor generates thrust as indicated by block arrow 952 and moment as indicated by block arrow 954. Hingeless rotor systems for tiltrotors are unlike prior art gimbaled systems in that they can transmit considerable large moments, also referred to as mast moments, to the airframe.

In preferred aircraft, a rotor system 910 comprises a tilting nacelle 918, which also serves as a tilting mast in the case of this hingeless rotor system, and a hub 940 that is not gimbaled with respect to the nacelle 918. The rotor rotates about the hub axis 922, also known as the "rotational axis of the hub". It can be seen that the rotor comprising rotor blades 914, 916 is disposed on a mast such as the nacelle 918. As used herein, a component that rotates can complete an entire revolution about an axis, while a component that tilts can only rotate through a portion of a complete revolution.

The tilt angle, indicated by arrow 932, is the angle between the horizontal airframe axis 920 and the hub axis 922. The rotor system 910 including the nacelle 918 and hub is tiltably coupled to the wing 902 by means of a tilt actuator and spindle. The rotor system 910 tilts with respect to the wing 902 about the tilt axis 924. Although the nacelle 918 or mast tilts, it is considered a "non-rotating" structure. The term "rotating structure" refers to the hub 940, blades 914, 916, spinner 912 and other components that rotate with the rotor.

First and second blades 914, 916 are preferably coupled to the hub 940 without hinges in the flap direction 938 and lag direction 939. The blades 914, 916 also transmit blade bending moments to the hub in the flap direction 938 and lag direction 939. In turn, the hub 940 transmits thrust and large hub bending moments to non-rotating structure including the nacelle 918, wing 902, and fuselage 904. In preferred embodiments, blade bending moments of 40000, 70000, 100000, 300000 and even 500000 foot-pounds are contemplated. Likewise, hub bending moments, as indicated by arrow 954, of at least 50000, 100000, 200000, 500000, and even 1000000 foot-pounds are contemplated. The structure and design of a preferred hub 940 have innovative elements that allows for the accommodation of such very large blade and hub moments.

A blade 914 can pitch about a blade pitch axis 926 in the direction indicated by arrow 936. This pitch motion is preferably accommodated by a feather bearing that acts as an interface between the root or shank of the blade 914 and the hub 940. In preferred embodiments, the feather bearing comprises a plurality of rolling elements lubricated with liquid oil pressurized to a pressure greater than the prevailing atmospheric pressure. In especially preferred embodiments, the rotor contains no elastomeric bearings. A blade 914 of a tiltrotor aircraft 900 can advantageously pitch about a blade pitch axis 926 by at least 30 degrees, 40 degrees, 60 degrees, 90 degrees, or even 110 degrees because of the use of rolling elements.

It is contemplated that blade pitch can be controlled and commanded by the pilot or flight control computer, and that blade pitching motion can have a collective command that increases thrust, and a cyclic command that generates mast moment by changing blade pitch as a function of azimuth while the blades rotate. When the blades are commanded in cyclic, the first blade 914 can have a concurrently different feather angle 936 from the second blade 916.

The rotor rotating structure of conventional helicopters rotates at a substantially constant rotational speed. In especially preferred embodiments, the rotor is a variable speed system, including that described in the Karem '365 patent. In-flight rotor speed ratios between the minimum rotational speed and maximum rotational speed of at most 80%, 60%, or even 40% are contemplated.

A tilting nacelle 918 can advantageously be configured to rotate by a tilt angle, indicated by arrow 932, of at least 90, 100, 110, or even 120 degrees. A 90 degree tilt would correspond with the ability to tilt from fully horizontal to fully vertical. In implementing differential nacelle tilt, it is advantageous to configure the tilting nacelle to rotate beyond this range. In an aircraft having two tilting nacelles, the tilt angle of each nacelle can be controlled independently of the other, as each has a separate actuation system.

Design Of Hub and Bearing Supporting Structure

High moment capable hub structures can employ several different methods of supporting a hingeless rotor blade. One especially preferred rotor hub structure can also be designed to internally support the bearings for rotor feathering, including when the blade has a larger diameter shank (for example, that of U.S. patent application Ser. No. 12/397,833), and the hub bearing has an extraordinarily large hub diameter.

Figure 10:
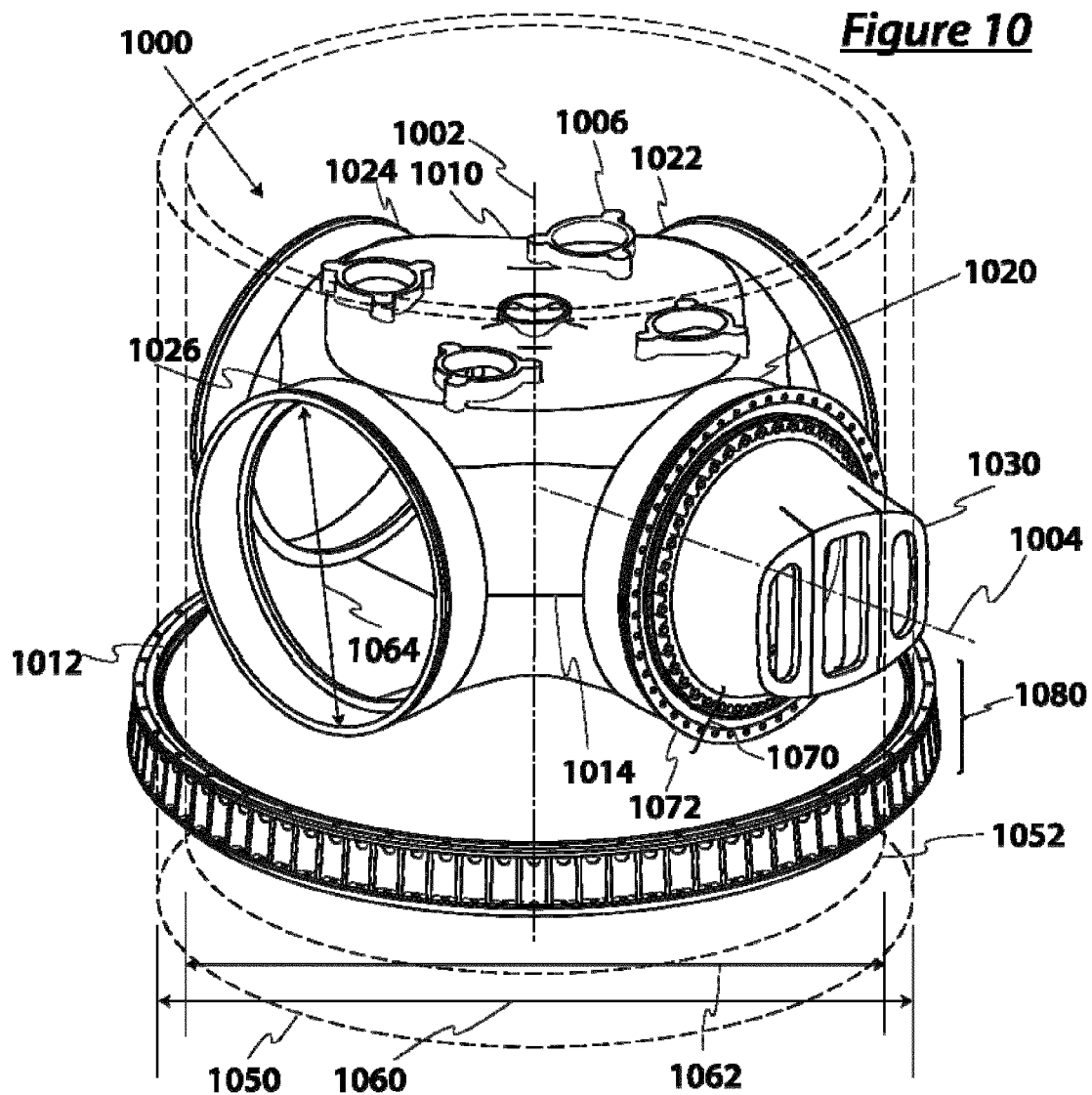
FIG. 10 is a perspective illustration of a preferred hub of a tiltrotor aircraft.

FIG. 10 is a perspective illustration of a preferred hub 1000 of a tiltrotor aircraft. The hub 1000 comprises an upper portion 1010 and lower portion 1012. In some preferred embodiments, the hub 1000 is of cast construction, in which case the upper and lower portions 1010, 1012 are unitary. In other, more preferred embodiments, the hub is of forged construction, in which case the upper and lower portions 1010, 1012 can be fabricated separately and joined at a split line 1014 by bolts or other means. All suitable materials are contemplated, including especially titanium and steel.

The hub 1000 includes accommodations for multiple rotor blades by means of four blade ports 1020, 1022, 1024, 1026. Any suitable number of blade ports is contemplated, but four is especially preferred. A blade port 1026 has a diameter 1064 suitable for accommodating a feather bearing. The upper portion 1010 of the hub 1000 has an actuator port 1006 to accommodate the installation of blade pitch actuator including for example the actuator described in U.S. patent application Ser. No. 12/383,310. A blade comprising a blade shank 1030 is joined with the hub 1000 at a blade port 1020 by means of a feather bearing 1070 and bearing ring 1072. The blade and blade shank pitch about the blade pitch axis 1002. This motion is accommodated by the feather bearing 1070.

The rotor and hub 1000 rotate about a hub axis 1002. Rotation about this axis 1002 is facilitated by a hub bearing 1080 between the airframe and hub 1000. Thus, the hub 1000 has a feather bearing 1070 that receives a shank 1030 of a blade and a hub bearing 1080 that carries a load to a non-rotating structure. The hub bearing 1080 has an inner diameter and an outer diameter associated with the innermost and outermost arcs traced by the innermost and outermost rolling elements, respectively, of the bearing 1080. In FIG. 10, the inner diameter 1060 of the hub bearing 1062 is visualized with the aid of a cylinder 1050 centered at the hub axis 1002.

Further, in preferred embodiments, the feather bearing 1070 is disposed within an imaginary cylinder 1052 centered at the rotational axis 1002 of the hub 1000. The imaginary cylinder 1052 has a diameter 1062. The diameter 1062 of the imaginary cylinder 1052 is advantageously no greater than 0.9, 1.0, 1.1, or 1.2 times a diameter 1060 of the hub bearing 1080. Such preferred configurations allow for the efficient transfer of bending moments from blades through a feather bearing through the hub to the hub bearing to an airframe. Viewed from another aspect, the inner diameter 1060 of the hub bearing 1080 is advantageously chosen to be at least 2, 3, 4, or even 5 times the diameter 1064 of a blade port 1026 or feather bearing 1070.

Figure 11:
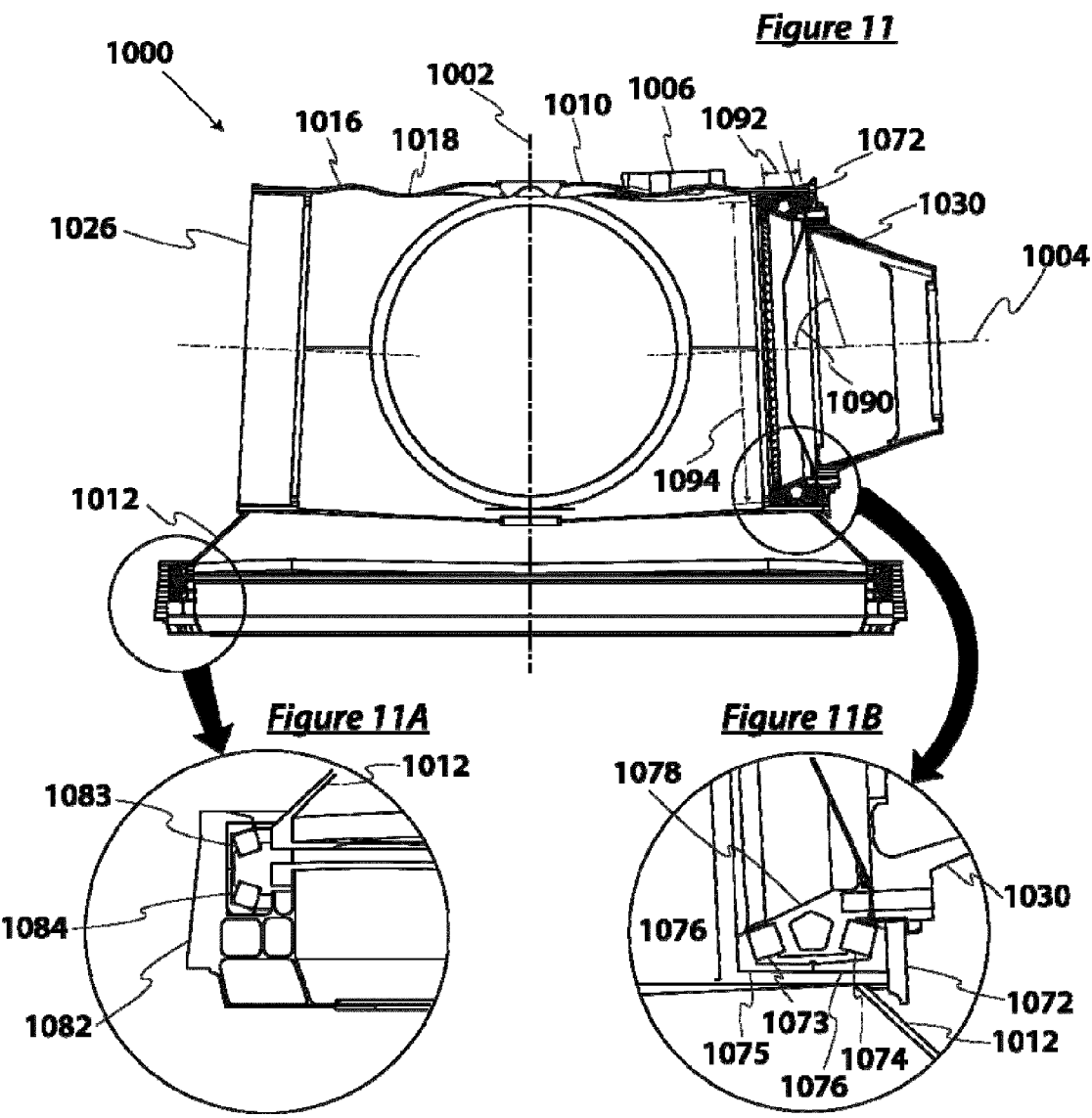

FIG. 11 is a cutaway side view of the hub 1000 of FIG. 10, while FIG. 11A is a side view detail of the hub bearing and FIG. 11B is a side view detail of the feather bearing. Preferred hubs have a monocoque structure with tailored shape and wall thickness. The upper portion 1010 of the hub 1000 advantageously includes some elevated portions 1016 and some recessed portions 1018. These elevated and recessed portions 1016, 1018 comprise gently curving the upper cap shell material of the hub upper portion 1010 to give the upper cap a pre-buckled shape and add stiffness.

A preferred feather bearing 1070 comprises a plurality of inner rolling elements, exemplified by rolling element 1073 and a plurality of outer rolling elements, exemplified by rolling element 1074, arranged as a tapered roller bearing. A shank race 1078 is common to these rolling elements 1073, 1074, and pitches with the blade shank 1030. A bearing ring 1072 clamps together an inner feather race 1075 and an outer feather race 1076 and applies a preload to the bearing 1070.

Rolling elements 1073, 1074 have a center-to-center distance 1092, while the feather bearing 1070 has a diameter 1094. Further, the rolling axis of an outer rolling element 1074 makes a contact angle 1090 with the blade pitch axis 1004. In preferred embodiment, the contact angle for the inside rolling element is the same magnitude but with opposite sign. In preferred embodiments, the contact angle 1090 is 50, 60, 70, or even 80 degrees. This facilitates the efficient transfer of bending moments from a blade to the hub. This reflects a very high ratio of blade feather bending moment to axial force (due to blade centrifugal force) expected of a stiff hingeless rotor.

Some preferred hub structures include closely spaced inner rolling elements 1073 and outer rolling elements 1074. Two bearings or two sets of rolling elements that are "closely spaced" preferably have a center-to-center spacing 1092 less than 20% of the mean diameter 1094 of the bearings, although other closely spaced bearings could have as low as 10% or 15% center-to-center spacing, or as high as 25% or 30% center-to-center spacing.

The hub bearing 1080 preferably comprises upper rolling elements 1083 and lower rolling elements 1084. The nacelle clamp ring 1082 does not rotate with the lower portion 1012 of the hub 1000.

The present inventive subject matter provides substantial advantages for transferring rotor loads from stiff hingeless rotors to an airframe. This was not appreciated in the prior art because known prior art rotors either used hinges, articulations, gimbals, or were relatively flexible hingeless rotors, and thus did not have to transfer large moments. In such prior art rotors, an extraordinarily large hub diameter would provide no advantage, and simply add additional weight. Further, a large hub diameter would increase the tangential speed of the hub bearing, decreasing hub bearing life. Thus, there is no motivation in the prior art to consider such a large hub and hub bearing diameter.

Figure 12:
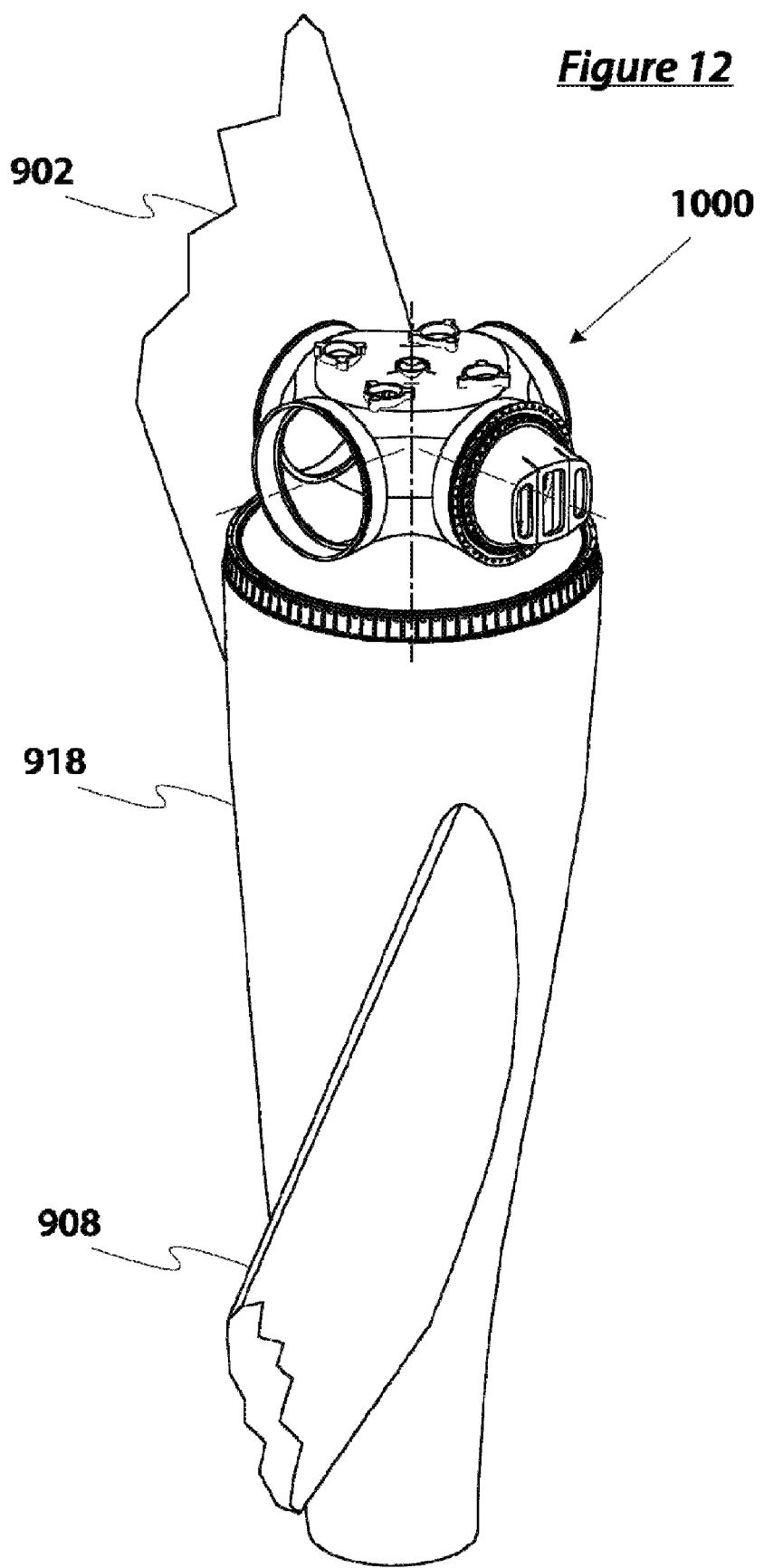
FIG. 12 is a perspective illustration of a hub attached to a tilting nacelle, which tilts relative to an inner wing.

FIG. 12 is a perspective illustration of a hub 1000 attached to a tilting nacelle 918, that tilts relative to an inner wing 902. In especially preferred embodiments, an outer wing 908 is coupled to, and tilts with, the nacelle 918. It can be seen that the hub 1000 has a diameter comparable to the nacelle diameter, increasing the efficiency of load transfer from the rotor to the airframe. One skilled in the art will appreciate that this rotor and rotor hub 1000 has no flap or lag hinges or elastomeric bearings.

FIG. 13 illustrates a preferred feather bearing configuration 1300, in which the inner bearing 1310 and outer bearing 1320 have load bearing rolling elements 1312 and 1322 (to reduce rotational friction), and the hub 1330 has a monocoque structure with tailored shape and wall thickness 1332 intended to allow the hub to deflect like a prismatic beam such that the feather bearing does not deviate more than a bearing section rotation angle 1342 of two degrees from an imaginary plane 1344 normal to the neutral axis 1346 of the hub 1330 supporting the bearing 1300. This hub sculpting and bearing race support design also maintains a low bearing section twist angle 1352 of below one degree about the centroid 1354 of the cross-section of the bearing configuration 1300. As used herein, the term "bearing section twist" refers to the maximum bearing section twist found in the bearing. Finally, the material distribution in the hub structure allows the bearing 1300 to retain its circularity while it is deflected on a plane 1344 normal to the neutral axis 1346 of the hub section supporting it.

Optionally, the first bearing defines a plane of rotation, and a plurality of rolling elements that are oriented to sustain loads out of the plane of the bearing. This bearing allows the blades of this preferred hub to sustain continuously cycling blade feather control, while under bending load, at least equal to 4000 degrees per second divided by the rotor diameter in feet.

In especially preferred embodiments, the rotorcraft has first and second rotor blades that define a rotor diameter of 20 to 200 feet, and the hub structure can sustain bending loads between 100 and 600 M.

The high feather and hub bending loads of large rigid rotors can benefit from the use of rolling element bearings and the improved lubrication and cooling capacity of a recirculating liquid oil system in order to provide an acceptable bearing life for the bearings and the low static friction coefficient essential for precise blade feather control.

Thus, specific embodiments and applications of a rotorcraft and rotor hub have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An aircraft having an airframe, comprising:
   a rotor disposed on a mast, and having a first blade;
   a hingeless hub that is not gimbaled such that bending moments are transferred from the rotor to the airframe;
   a feather bearing that receives a shank of a blade
   a hub bearing operationally interposed between an airframe of the aircraft and the hub that carries the bending moments to a non-rotating structure; and
   the feather bearing disposed within an imaginary cylinder centered at a rotational axis of the hub and the cylinder having a diameter no greater than 1.2 times an inner diameter of the hub bearing.

2. The aircraft of claim 1, wherein the imaginary cylinder has a diameter no greater than the inner diameter of the hub bearing.

3. The aircraft of claim 1, wherein the rotor has first and second blades that define a rotor diameter of at least 20 feet.

4. The aircraft of claim 1, wherein the rotor has first and second blades that define a rotor diameter of at least 40 feet.

5. The aircraft of claim 1, wherein the mast is a tilting mast.

6. The aircraft of claim 1, further comprising a wing that carries the mast.

7. The aircraft of claim 1, wherein the first blade is coupled to the feather bearing, and the blade pitches about a pitch axis.

8. The aircraft of claim 1, wherein the feather bearing comprises a plurality of rolling elements.

9. The aircraft of claim 8, wherein the plurality of rolling elements are lubricated with liquid oil under a pressure greater than atmospheric pressure.

10. The aircraft of claim 1, further comprising a second blade, capable of a concurrently different feather angle from the first blade.

11. The aircraft of claim 1, the hub capable of withstanding bending moments of at least 50,000 foot-pounds.

12. The aircraft of claim 1, wherein the rotor that has no flap or lag hinges.

13. The aircraft of claim 1, wherein the rotor contains no elastomeric bearings.

14. The aircraft of claim 1, wherein the rotor is a variable speed rotor.

15. The aircraft of claim 1, wherein the rotor is an Optimum Speed Tilt Rotor (OSTR).

16. The aircraft of claim 1, further comprising a provision for a landing gear.

* * * * *